United States Patent [19]

Fishler et al.

[11] Patent Number: 5,078,918
[45] Date of Patent: Jan. 7, 1992

[54] NOVEL FLAME-RETARDANT COMPOSITIONS

[75] Inventors: Theodor-Morel Fishler, Haifa; Michael Peled, Beer Sheva; Leonard M. Shorr, Haifa, all of Israel

[73] Assignee: Bromine Compounds Ltd., Beer-Sheva, Israel

[21] Appl. No.: 359,996

[22] Filed: Jun. 1, 1989

[30] Foreign Application Priority Data

Jun. 2, 1988 [IL] Israel .................................. 86604

[51] Int. Cl.⁵ .................... C09K 21/08; C08F 18/22
[52] U.S. Cl. ........................ 252/609; 526/292.5; 428/921
[58] Field of Search ............... 252/609; 526/292.5

[56] References Cited

U.S. PATENT DOCUMENTS

| | | |
|---|---|---|
| 3,210,326 | 10/1965 | Tousignant et al. ........... 526/292.5 |
| 3,635,850 | 1/1972 | Birkner et al. ................. 252/609 |
| 4,211,730 | 7/1980 | Vollkommek et al. ........ 526/292.5 |
| 4,243,579 | 1/1981 | Keogh .......................... 252/609 |
| 4,284,732 | 8/1981 | Petersen et al. .............. 252/609 |
| 4,631,148 | 12/1986 | Braksmayer et al. ........ 252/609 |
| 4,728,463 | 3/1988 | Sutker et al. ................ 252/609 |
| 4,849,134 | 7/1989 | Georlette et al. ............ 252/609 |

FOREIGN PATENT DOCUMENTS

| | | | |
|---|---|---|---|
| 1081410 | 9/1984 | Japan ............... | 526/292.5 |
| 2010109 | 7/1985 | Japan ............... | 526/292.5 |

Primary Examiner—Robert L. Stoll
Assistant Examiner—Joseph D. Anthony
Attorney, Agent, or Firm—Michael N. Meller

[57] ABSTRACT

Novel flame-retardant composition incorporate as an active ingredient pentabromobenzylester monoacrylate, of a product of its in situ reaction.

Articles made of flammable synthetic resins can be rendered flame-retarded by the incorporation of the novel flame-retandant compositions.

5 Claims, No Drawings

NOVEL FLAME-RETARDANT COMPOSITIONS

FIELD OF THE INVENTION

The present invention relates to novel flame retardant compositions, to a method for rendering flammable synthetic resins flame-resistant, and to flame-resistant plastic compositions comprising them.

BACKGROUND OF THE INVENTION

It has been known for some time that petabromobenzylester polyacrylate (PBB-PA) is a valuable flame-retardant material, useful in a number of synthetic resins. PBB-PA is prepared by the polymerization of pentabromobenzylester monoacrylate (PBB-MA), e.g., by the process described in DE 25 27 802. The so-obtained PBB-PA polymeric flame-retardant material is then incorporated into the synthetic resin to which it is desired to impart flame-retardant properties, by techniques known to the skilled engineer.

SUMMARY OF THE INVENTION

It has now been most surprisingly found, and this is an object of the invention, that the monomer pentabromobenzylester monoacrylate also by himself can be employed as a flame-retardant agent as such, and can be incorporated into the synthetic resin, without first polymerizing it to obtain PBB-PA.

It has further been found, and this is another object of the invention, that synthetic resins which incorporate PBB-MA present substantially shorter total and maximal flaming times in the UL94 test.

Various advantages deriving from the use of PBB-MA, as compared to PBB-PA, are self evident, e.g., an entire reaction step—the polymerization of PBB-MA to PBB-PA—can be dispensed with. The precise nature of the product obtained when PBB-MA is incorporated into the synthetic resin is not known. Thus, it is unclear whether a mere dispersion of PBB-MA in the polymer matrix is obtained, or whether a partial graft polymer results, or whether part of the monomer polymerizes, or copolymerizes with the matrix. Any one of the above-noted processes, or the combination of two or more of them, may occur, and different behavior may be involved with different polymeric matrices.

Thus the present invention is directed to flame-retardant compositions which comprise, as an active ingredient, pentabromobenzyl monoacrylate, or the product of its in situ reaction. As will be apparent to those skilled in the art, the said compositions may further comprise additional additives, such as conventionally employed flame-retardant synergists, fillers, heat and UV stabilizers, antioxydants, lubricants, plasticizers, etc., and may be provided in substantially pure form, or in different compositions thereof, or in master batches. It should also be understood that the exact mechanism by means of which PBB-MA imparts flame retardancy to synthetic resins has not been elucidated, but the exact understanding of this phenomena is not critical. However, PBB-MA may at least partly react with other compounds or additives in the polymeric matrix, to give grafts or other types of compounds. However, as long as the result of such a reaction still provides an improvement of the flame retardancy, the goals of the invention are achieved. It should be therefore understood that the term "the product of the in situ reaction" of PBB-MA refer to any such compound formed during plastic processing, storage, handling or the like.

Also encompassed within the present invention is a method for imparting flame-retardant properties to a flammable synthetic resin, which method comprises incorporating into the said synthetic resin pentabromobenzyl monoacrylate. The incorporation method can be any of those commonly employed in the art, e.g., PBB-MA can be blended with the synthetic resin before processing thereof in the plastic processing apparatus, or mixed during processing. The actual incorporation method may affect the precise nature of the resulting dispersion of PBB-MA in the matrix, as hereinbefore detailed, but is not critical to the invention. The flame retarded plastic composition which incorporates PBB-MA, and which is obtained by the aforesaid method, also forms part of the invention. The invention is directed not only to compositions, methods and processes, but also to the use of PBB-MA as a flame retardant agent.

DETAILED DESCRIPTION

The above and other characteristics and advantages of the invention will be better understood from the following examples, in which non-limiting embodiments of the invention are described for the purpose of illustration.

EXAMPLE 1

In this and the following examples, contents of active material are given as percent of bromine in the product, to permit a comparison between PBB-MA- and PBB-PA-containing specimens.

Concentrates of PBB-PA and PBB-MA containing 10% bromine were prepared in the BUSS extruder compounder, according to the following formulations:

| Component | (%) | (%) |
|---|---|---|
| PBB-PA | 14.3 | — |
| PBB-MA | — | 14.3 |
| Antimony Trioxide | 7.15 | 7.15 |
| PBT - VALOX 420 (ex General Electric) | 78.55 | 78.55 |
| Bromine | 10 | 10 |

The processing temperature profile was: CO-kneader: 220° C.; pellettizer: 215° C.; die: 207° C. The concentrates were "diluted" with pure PBT to the required bromine level, and specimens were prepared for the different tests with an Arburg injection-molding machine, at the following conditions:

Processing Temperature Profile: inlet: 210° C.; middle zone: 235° C., final zone: 250° C.; nozzle: 275° C.

Working Pressure: Injection Pressure: 60 Atm.; Holding Pressure: 40 Atm.; Back Pressure: 10 Atm.

Timing: Injection Time: 0.1 sec.; Holding Time: 4.0 sec.; Cooling Time: 14.0 sec.; Mould Opening Time: 0.1 sec.; Injection Delay: 0.5 sec..

A 5% Br PBT (polybutyleneterephthalate) specimen (Valox-420) was prepared, using commercially available PBB-PA (FR 1025—Eurobrom, Holland) and PBB-MA (prepared by IMI, Haifa, Israel).

The data and results of tests carried out with these specimens are set forth in Table I below. The virtually zero flaming time of the composition of the invention should be noted.

EXAMPLE 2

Two HIPS (High Impact Polystyrene) specimens (10% Br and a 14% Br) were prepared according to the following procedure, and using the same PBB-MA as in Example 1. The formulation employed was the following:

| Component | Thickness [mm] | |
|---|---|---|
| | 1.6 | 3.2 |
| HIPS/Huels VESTYRON 638 | 74.4 | 81.5 |
| ANTIMONY TRIOXIDE (Blue Star - Campine) | 5.1 | 3.6 |
| Mg-Stearate (ex WITCO) | 0.5 | 0.5 |
| TINUVIN P (ex CIBA-GEIGY) | 0.5 | 0.5 |
| PBB-PA/PBB-MA | 19.5 | 13.9 |
| Br/Sb Atomic Ratio | 5 | 5 |
| Bromine | 14 | 10 |

The formulations were compounded in a Brabender Plastograph at 200° C. for 4 minutes at 40 RPM, and subsequently cooled to 130° C. at 20 RPM (total processing time: 15-16 mins.). The resulting melt was press-plated 1 min. at 200° C. at 1 Atm., and during another minute at 100 Atm., after which it was cooled during 4 mins. to 120° C.

Specimens were prepared with a ribbon saw.
The results are shown in Table II below.

EXAMPLE 3

Example 2 was repeated, but using ABS (Acrylonitrile-Butadiene-Styrene) as the matrix, to give final 10, 12 and 14% Br contents. The results are detailed in Table III below.

EXAMPLE 4

Flame-retarded Nylon 6 specimens (Capron 8200 MS) were prepared, following the procedures of Example 1, to give a final 9% Br content. The results are set forth in Table IV.

The above description and examples have been given for the purpose of illustration and are not intended to be limitative. Many different synthetic resins, compounding conditions and additives can be employed, together with PBB-MA, without exceeding the scope of the invention.

TABLE I

| 5% Br in PBT (Valox-420) | | | |
|---|---|---|---|
| | Flame-retardant Additive | | |
| | PBB-PA | PBB-MA | None |
| Flame-Retardancy (UL 94 - 3.2 mm) | | | |
| Max Flam. (sec) | 5 | 0 | >180 |
| Total Flam. (sec) | 10 | 0 | >900 |
| Drip | no | no | 5 |
| Rating | V0 | V0 | NR |
| HDT (°C.)* | 198 ± 2 | 201 ± 0.4 | 205 |
| Mechanical Properties | | | |
| IZOD Notched (J/m) | 87 ± 4 | 91 ± 6 | 100 |
| Tensile strength at break (MPa) | 104 ± 3 | 109 ± 1 | 115 |
| Elongation at break (%) | 2.4 ± 0.3 | 2.4 ± 0.0 | 3 |
| Tensile Modulus (MPa) | 9500 ± 470 | 9910 ± 530 | 8000 |
| Flexural Strength (MPa) | 175 ± 8 | 172 ± 2 | 190 |
| Flexural Modulus (MPa) | 6910 ± 380 | 7560 ± 220 | 7500 |
| CTI (V) | 240-260 | 250-270 | 460-520 |

*Heat Distortion Temperature at 264 psi.

TABLE II

| | FR - HIPS | | | |
|---|---|---|---|---|
| | Formulation No. | | | |
| Component | 1 | 2 | 3 | 4 |
| Bromine (%) | 10 | 10 | 14 | 14 |
| HIPS - VESTYRON 638 (ex Huels) | 81.5 | 81.1 | 74.4 | 73.9 |
| PBB-PA (ex Eurobrom) | — | 14.3 | — | 20 |
| PBB-MA ex IMI | 13.9 | — | 19.5 | — |
| Antimony Trioxide (ex Campine) | 3.6 | 3.6 | 5.1 | 5.1 |
| Mg-Stearate (ex WITCO) | 0.5 | 0.5 | 0.5 | 0.5 |
| TINUVIN P (ex Ciba-Geigy) | 0.5 | 0.5 | 0.5 | 0.5 |
| PROPERTIES: | | | | |
| UL-94 | | | | |
| 1.6 mm thickness | — | — | V0 | V0 |
| 3.2 mm thickness | V0 | V0 | — | — |
| IZOD NOTCHED IMPACT [J/m] | 49 | 38 | — | — |
| HDT [°C.] at 1.82 KPa load | 73 | 79 | — | — |

TABLE III

| | FR - ABS | | | |
|---|---|---|---|---|
| | Formulation No. | | | |
| Component | 1 | 2 | 3 | 4 |
| Bromine (%) | 14 | 12 | 12 | 10 |
| ABS (ex Borg-Warner) | 75.8 | 79.3 | 79.7 | 83.1 |
| PBB-PA (ex Eurobrom) | 20.0 | 17.1 | — | — |
| PBB-MA ex IMI | — | — | 16.7 | 13.9 |
| Antimony Trioxide (ex Campine) | 4.2 | 3.6 | 3.6 | 3.0 |
| PROPERTIES: | | | | |
| UL-94 (1.6 mm thickness) | V0 | V0 | V0 | V0/V1 |
| IZOD NOTCHED IMPACT [J/m] | 85 | — | — | — |
| HDT [°C.] at 1.82 KPa load | 61 | — | — | — |

TABLE IV

| | FR - Nylon 6 (CAPRON 8200 HS) | | |
|---|---|---|---|
| | Formulation No. | | |
| Component | 1 | 2 | 3 |
| Bromine (%) | 10 | 9 | 9 |
| CAPRON 8200 HS (ex Allied Chem. Corp) | 79.5 | 81.3 | 81.3 |
| PBB-PA (ex Eurobrom) | 14.3 | 12.9 | — |
| PBB-MA ex IMI | — | — | 12.9 |
| Antimony Trioxide (ex Campine) | 4.8 | 4.3 | 4.3 |
| Mg-Stearate (ex WITCO) | 0.5 | 0.5 | 0.5 |
| HOSTAFLON TF 9202 (ex Hoechst) | 1.0 | 1.0 | 1.0 |
| PROPERTIES: | | | |
| UL-94 1.6 mm | | | |
| Max. Flam. [sec] | 8 | 11 | 5 |
| Total. Flam. [sec] | 33 | 36 | 14 |
| DRIP | no | 1 | no |
| RATING | V0 | V0/V1 | V0 |

We claim:

1. A flame-retardant composition comprising as an active ingredient pentabromobenzylester monoacrylate, alone or together with other reactive flame retardant agents.

2. A method for imparting flame-retardant properties to a flammable synthetic resin, comprising incorporating therein pentabromobenzylester monoacrylate.

3. Flame-retarded plastic materials prepared by incorporating pentabromobenzylester monoacrylate into a synthetic resin.

4. Flame-retarded plastic materials, comprising a synthetic resin and pentabromobenzyl monoacrylate, or the product of its in situ reaction.

5. A flame-retarded plastic composition containing a polymeric matrix and pentabromobenzylester monoacrylate or the product of its in situ reaction with the polymeric composition, alone or together with other flame-retardant agents.

* * * * *